US010701523B2

(12) United States Patent
Yamaguchi

(10) Patent No.: US 10,701,523 B2
(45) Date of Patent: Jun. 30, 2020

(54) MOBILE DEVICE AND METHOD OF CONTROLLING MOBILE DEVICE

(71) Applicant: DENSO CORPORATION, Kariya, Aichi-pref. (JP)

(72) Inventor: Taichi Yamaguchi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/682,006

(22) Filed: Nov. 13, 2019

(65) Prior Publication Data
US 2020/0084584 A1 Mar. 12, 2020

Related U.S. Application Data

(63) Continuation of application No. PCT/JP2018/012618, filed on Mar. 28, 2018.

(30) Foreign Application Priority Data

Jul. 3, 2017 (JP) ................................ 2017-130729

(51) Int. Cl.
*H04W 4/029* (2018.01)
*B60R 25/24* (2013.01)
(Continued)

(52) U.S. Cl.
CPC ............. *H04W 4/029* (2018.02); *B60R 25/24* (2013.01); *H04W 4/80* (2018.02);
(Continued)

(58) Field of Classification Search
CPC ....... H04W 4/029; H04W 4/80; H04W 12/06; H04W 88/085; H04W 12/00503; B60R 25/24
See application file for complete search history.

(56) References Cited

U.S. PATENT DOCUMENTS 6,639,511 B2 * 10/2003 Haruna ................... B60R 25/04
307/10.1
9,571,629 B2 * 2/2017 Kadous ............. H04M 1/72577
(Continued)

FOREIGN PATENT DOCUMENTS

| JP | 201152505 A | 3/2011 |
| JP | 201689563 A | 5/2016 |
| JP | 201828182 A | 2/2018 |

*Primary Examiner* — Julio R Perez
(74) *Attorney, Agent, or Firm* — Harness, Dickey & Pierce, P.L.C.

(57) ABSTRACT

A mobile device includes a receiver receiving a radio wave from a wireless communication device, a transmitter transmitting an authentication signal when the radio wave that is received requests transmission of the authentication signal, a vibration detector detecting whether there is vibration, and an operation controller bringing the mobile device into a communication enabled state where the receiver and the transmitter are in operation when the vibration is detected, and bringing the mobile device into a communication disabled state where at least one of the receiver and the transmitter is stopped when the vibration is not detected. When the radio wave is received in the communication enabled state, the operation controller brings the mobile device into a communication enabled continuous state where the receiver and the transmitter are in operation even if the vibration is no longer detected.

4 Claims, 8 Drawing Sheets

(51) Int. Cl.
*H04W 12/00* (2009.01)
*H04W 88/08* (2009.01)
*H04W 12/06* (2009.01)
*H04W 4/80* (2018.01)

(52) U.S. Cl.
CPC ..... *H04W 12/00503* (2019.01); *H04W 12/06* (2013.01); *H04W 88/085* (2013.01)

(56) References Cited

U.S. PATENT DOCUMENTS

| | | | |
|---|---|---|---|
| 9,637,086 B2* | 5/2017 | Sanji | B60R 25/24 |
| 10,157,542 B2* | 12/2018 | Sanji | B60R 25/24 |
| 10,407,025 B2* | 9/2019 | Kim | G07C 9/00309 |
| 2004/0148091 A1* | 7/2004 | Masclet | G01C 21/3608 |
| | | | 701/539 |
| 2006/0273888 A1* | 12/2006 | Yamamoto | B60R 25/24 |
| | | | 340/426.36 |
| 2010/0050713 A1* | 3/2010 | Nagao | B60R 25/2036 |
| | | | 70/255 |
| 2010/0073153 A1* | 3/2010 | Yamaguchi | B60R 25/2036 |
| | | | 340/426.17 |
| 2015/0050908 A1* | 2/2015 | Basir | B60W 50/045 |
| | | | 455/404.2 |
| 2015/0066607 A1* | 3/2015 | Fiorucci | G07B 15/02 |
| | | | 705/13 |
| 2017/0067273 A1* | 3/2017 | Yamashita | E05B 79/08 |
| 2019/0003439 A1* | 1/2019 | Chaplow | B60R 25/24 |
| 2019/0088125 A1* | 3/2019 | Park | H04W 4/40 |
| 2019/0106021 A1* | 4/2019 | Dietrich | B60N 2/0292 |
| 2019/0363816 A1* | 11/2019 | Kusakabe | H04J 3/0682 |

* cited by examiner ined States Patent
MOBILE DEVICE AND METHOD OF CONTROLLING MOBILE DEVICE

CROSS REFERENCE TO RELATED APPLICATIONS

The present application is a continuation application of International Patent Application No. PCT/JP2018/012618 filed on Mar. 28, 2018, which designated the U.S. and claims the benefit of priority from Japanese Patent Application No. 2017-130729 filed on Jul. 3, 2017. The entire disclosures of all of the above applications are incorporated herein by reference.

TECHNICAL FIELD

The present disclosure relates to a mobile device a method of controlling a mobile device.

BACKGROUND

There has been developed and now widely applied a technique called passive entry, which relates to automatic unlocking through determination of whether to unlock a door when a vehicle detects an approaching person, in order to skip troublesome work of taking out a key every time the door of the vehicle needs to be unlocked.

SUMMARY

The present disclosure provides a mobile device or a method of controlling a mobile device. When vibration of the mobile device is not detected, the mobile device is brought into a communication disabled state where at least one of a function of receiving a radio wave from a wireless communication device and a function of transmitting an authentication signal to the wireless communication device is stopped. When vibration of the mobile device is detected, the mobile device is brought into a communication enabled state where the function of receiving the radio wave from the wireless communication device and the function of transmitting the authentication signal to the wireless communication device are active. When the radio wave is received from the wireless communication device in the communication enabled state, the mobile device is kept in the communication enabled state even if the vibration is no longer detected.

BRIEF DESCRIPTION OF DRAWINGS

Objects, features and advantages of the present disclosure will become more apparent from the following detailed description made with reference to the accompanying drawings. In the drawings.

DETAILED DESCRIPTION

Figure 1:
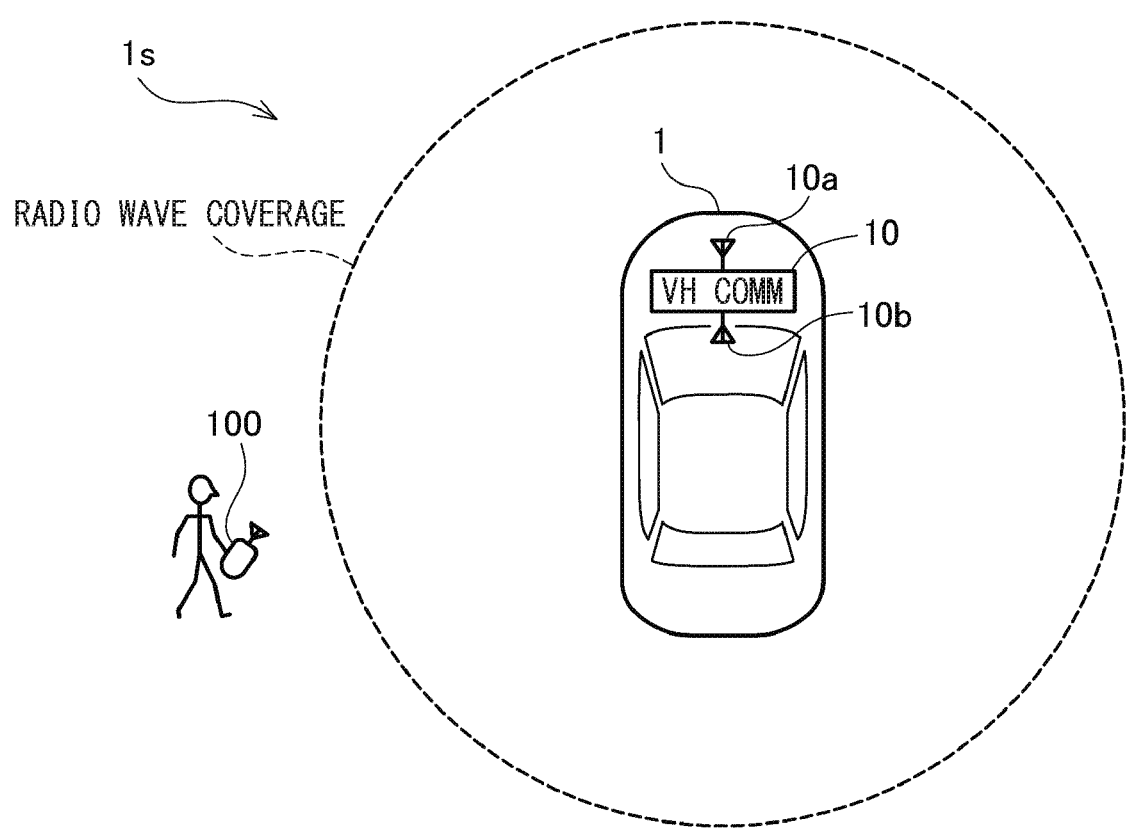
FIG. 1 is an explanatory view of a passive entry system including a mobile device carried by a user and a vehicle-mounted communication device mounted on a vehicle.

According to a passive entry technique, a wireless communication device (hereinafter, referred to as a vehicle-mounted communication device) having an authentication function is mounted on a vehicle. The vehicle-mounted communication device communicates with a small wireless communication device (hereinafter, referred to as a mobile device) carried by a person trying to get on the vehicle, to determine whether the mobile device is proper for authentication. When the mobile device is authenticated through the determination, a door of the vehicle is unlocked or is ready to be unlocked.

The mobile device is carried for use and thus operates with electric power supplied from a battery. The mobile device is accordingly requested to suppress exhaustion of the battery. In view of this, a vibration sensor may be incorporated in the mobile device to avoid receiving a radio wave from the vehicle-mounted communication device through determination that the mobile device is not in use if vibration is not detected.

The mobile device incorporated with the vibration sensor can avoid exhaustion of the battery due to useless wireless communication with the vehicle-mounted communication device while the mobile device is not in use. In addition, the mobile device incorporated with the vibration sensor can prevent a theft called relay attack of improperly unlocking a door of a vehicle. For example, even in a case where a radio wave from the vehicle parked in a garage is transferred to an entrance by a repeater, the mobile device placed in the entrance does not recognize the radio wave and does not return an authentication signal.

However, the above-described technique has an issue that the vehicle-mounted communication device cannot recognize the mobile device existing in a vehicle interior when the mobile device in the vehicle interior no longer detects vibration and comes into a state of not receiving any radio wave from the vehicle-mounted communication device.

A mobile device according to an aspect of the present disclosure includes a receiver configured to receive a radio wave from a wireless communication device mounted on a vehicle, a transmitter configured to transmit an authentication signal when the radio wave that is received by the receiver requests transmission of the authentication signal, a vibration detector configured to detect whether there is vibration, an operation controller configured to bring the mobile device into a communication enabled state where the receiver and the transmitter are in operation when the vibration is detected, and configured to bring the mobile device into a communication disabled state where at least one of the receiver and the transmitter is stopped when the vibration is not detected. When the radio wave from the wireless communication device is received in the communication enabled state, the operation controller brings the mobile device into a communication enabled continuous state where the receiver and the transmitter are in operation even when the vibration is no longer detected.

A method of controlling a mobile device according to another aspect of the present disclosure is for controlling the mobile device configured to transmit an authentication signal to a wireless communication device mounted on a vehicle by communication with the wireless communication device, and includes detecting whether there is vibration of the mobile device, bringing the mobile device into a communication disabled state where at least one of a function of receiving a radio wave from the wireless communication device and a function of transmitting the authentication signal to the wireless communication device is stopped when the vibration is not detected, bringing the mobile device into a communication enabled state where the function of receiving the radio wave from the wireless communication device and the function of transmitting the authentication signal to the wireless communication device are active when the vibration is detected, and keeping the mobile device in the communication enabled state even if the vibration is no longer detected when the radio wave is received from the wireless communication device in the communication enabled state.

With the mobile device and the method of controlling the mobile device described above, the mobile device receives the radio wave from the wireless communication device before being taken into the vehicle interior and is kept in the communication enabled state. The mobile device is kept in the state of being able to transmit and receive the radio wave to and from the vehicle-mounted communication device even if the vibration is no longer detected after the mobile device is taken into the vehicle interior. The vehicle-mounted communication device can thus recognize the mobile device in the vehicle interior.

An embodiment will be described hereinafter to clarify the present disclosure.

FIG. 1 exemplarily shows a passive entry system 1s including a mobile device 100 carried by a user and a vehicle-mounted communication device (VH COMM) 10 mounted on a vehicle 1. The vehicle-mounted communication device 10 according to the present disclosure corresponds to a wireless communication device mounted on a vehicle. As shown in the figure, the vehicle-mounted communication device 10 includes an external antenna 10a configured to transmit a radio wave to outside the vehicle 1 or receive a radio wave from the outside, and an internal antenna 10b configured to transmit a radio wave to a vehicle interior of the vehicle 1 or receive a radio wave from the vehicle interior.

The vehicle-mounted communication device 10 in the passive entry system 1s transmits a radio wave at a constant cycle from the external antenna 10a to search for the mobile device 100 existing in the periphery of the vehicle 1. If the user of the vehicle 1 carries the mobile device 100 and approaches the vehicle 1, the mobile device 100 receives a radio wave upon entering radio wave coverage of the external antenna 10a and replies to the radio wave. The vehicle-mounted communication device 10 receives a radio wave returned from the mobile device 100 to recognize that the mobile device 100 exists in the periphery of the vehicle 1.

The vehicle-mounted communication device 10 transmits a radio wave that requests transmission of an authentication signal upon recognition of existence of the mobile device 100. The mobile device 100 having received the radio wave returns an authentication signal by means of a radio wave. The vehicle-mounted communication device 10 receives the authentication signal from the mobile device 100 and determines whether the mobile device 100 is proper in accordance with the authentication signal. If the mobile device 100 is confirmed to be proper by the authentication, doors of the vehicle 1 are unlocked or are ready for immediate unlocking. The so-called passive entry is achieved in this manner.

After the user carrying the mobile device 100 gets on the vehicle 1, the vehicle-mounted communication device 10 causes the internal antenna 10b to communicate with the mobile device 100 existing in the vehicle interior. The user can accordingly press an engine start button to start an engine without taking out the mobile device 100. Otherwise, the user can recognize existence of the mobile device 100 in the vehicle interior and can prevent confinement of the mobile device 100 in the vehicle interior.

Figure 2:
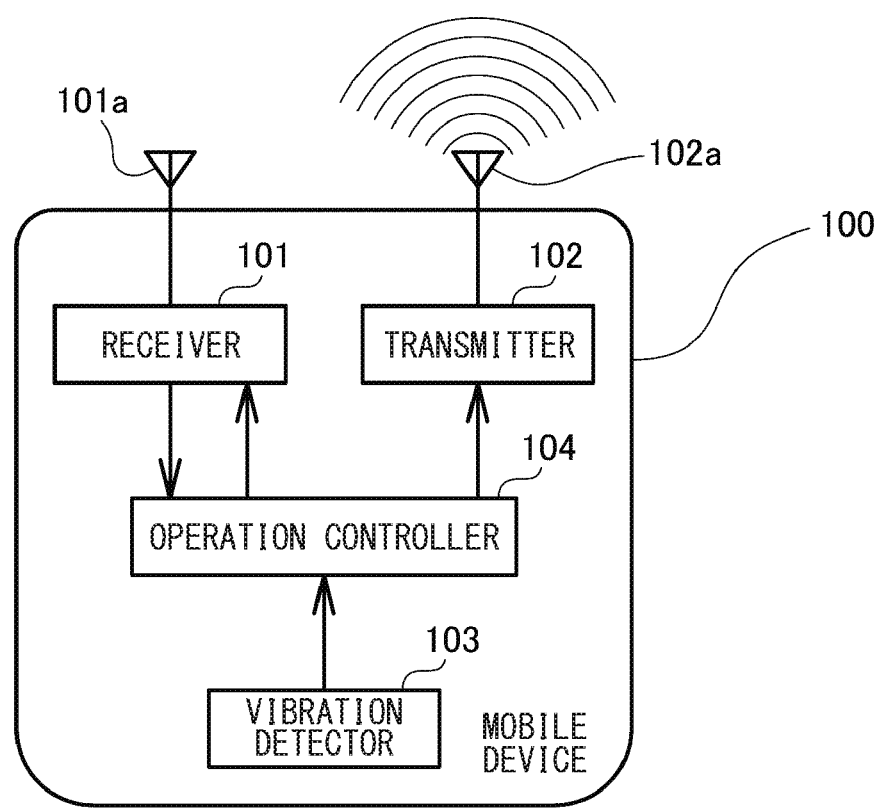
FIG. 2 is an explanatory view showing an internal structure of the mobile device according to a present embodiment.

FIG. 2 shows an internal structure of the mobile device 100 according to the present embodiment for achievement of passive entry. As shown in the figure, the mobile device 100 according to the present embodiment includes a receiver 101, a transmitter 102, a vibration detector 103, an operation controller 104, and the like for achievement of passive entry.

These "units" each have an abstract concept obtained by focusing on functions of the mobile device 100 for achievement of passive entry and conveniently categorizing contents in the mobile device 100, and the mobile device 100 is not physically divided into these "units". Each of these "units" can thus be achieved as a computer program executed by a CPU, can be achieved as an electronic circuit including an LSI, or can be achieved through combination of these.

The receiver 101 is connected to a reception antenna 101a, and is configured to receive a radio wave transmitted from the vehicle-mounted communication device 10 and output the radio wave to the operation controller 104.

The transmitter 102 is connected to a transmission antenna 102a, and is configured to transmit a radio wave to the outside under control of the operation controller 104.

The mobile device 100 according to the present embodiment uses a radio wave having a long wavelength and called an LF wave for radio wave reception, and uses a radio wave having a short wavelength and called an RF wave for radio wave transmission, and thus includes the reception antenna 101a and the transmission antenna 102a as dedicated antennas. Needless to say, in a case where radio waves having equal wavelengths are used for transmission and reception, the reception antenna 101a and the transmission antenna 102a may be embodied by a single antenna.

The vibration detector 103 detects whether there is vibration of the mobile device 100 and outputs a detection result to the operation controller 104. Examples of the vibration detector 103 include various sensors such as a vibration sensor, a gyro sensor, and an acceleration sensor.

When the operation controller 104 receives the radio wave received by the receiver 101, the operation controller 104 outputs a signal indicating existence of the mobile device 100 or a signal used for authentication in accordance with a content of the radio wave, to the transmitter 102 that transmits the signal as a radio wave. The vehicle-mounted communication device 10 mounted on the vehicle 1 receives a radio wave returned from the mobile device 100 and having a content corresponding to a content of a transmitted radio wave, to achieve the so-called passive entry.

If the vibration detector 103 no longer detects the vibration, the operation controller 104 determines that the mobile device 100 is not in use and is stored in a storage space or the like, and stops at least one of the receiver 101 or the transmitter 102. This configuration can inhibit exhaustion of a battery used to drive the mobile device 100 and further avoids a case where the mobile device 100 erroneously replies to a radio wave transferred from the vehicle 1 located at a far place via a radio wave repeater and the doors of the vehicle 1 are unlocked improperly.

The mobile device 100 cannot communicate with the vehicle-mounted communication device 10 when at least one of the receiver 101 and the transmitter 102 is stopped. Such a state where at least one of the receiver 101 and the transmitter 102 is stopped will be hereinafter called a "communication disabled state".

The vibration detector 103 detects vibration when the user thereafter picks up the mobile device 100. Both the receiver 101 and the transmitter 102 are accordingly made to operate. Passive entry is achieved in this manner.

The mobile device 100 becomes communicable with the vehicle-mounted communication device 10 when both the receiver 101 and the transmitter 102 are made to operate. Such a state where both the receiver 101 and the transmitter 102 are in operation will be hereinafter called a "communication enabled state".

Figure 3:
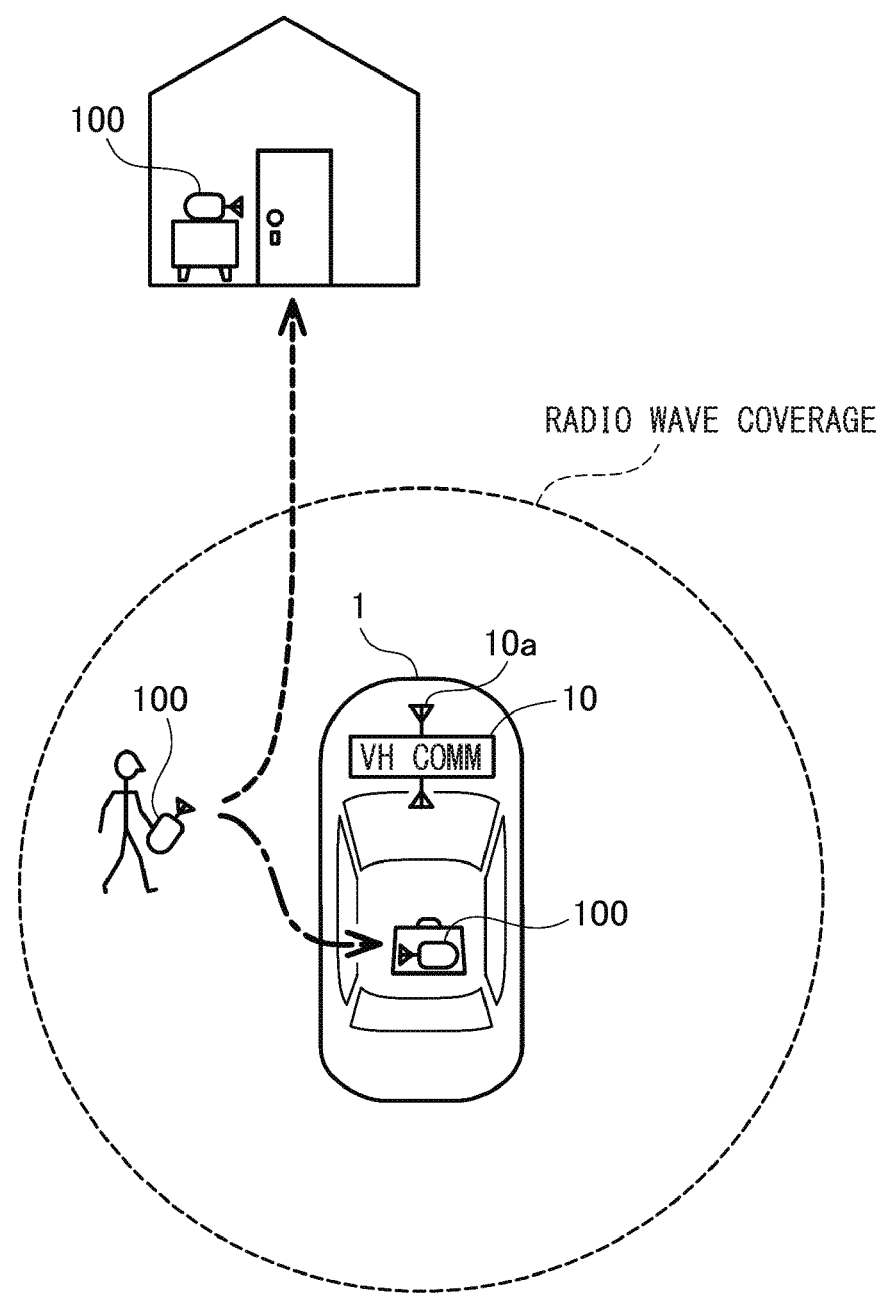
FIG. 3 is an explanatory view indicating a reason why the mobile device existing in a vehicle interior cannot be recognized.

If the mobile device 100 is switched between the communication disabled state and the communication enabled state depending on whether there is vibration, the vehicle-mounted communication device 10 may fail to recognize the mobile device 100 existing in the vehicle interior. For example, in a case where the user carrying the mobile device 100 shown in FIG. 3 goes home as indicated by a bold broken arrow and places the mobile device 100 on a shelf, the mobile device 100 can be brought into the communication disabled state without any problem.

After the user carrying the mobile device 100 gets on the vehicle 1 as indicated by a bold dot-and-dash arrow in the figure, the mobile device 100 may fail to detect vibration. Particularly in a case where the user carries the mobile device 100 stored in a bag, the user in the vehicle 1 places the bag on a seat or the floor and the mobile device 100 may fail to detect vibration with a high probability. With the mobile device 100 brought into the communication disabled state in such a case, the vehicle-mounted communication device 10 cannot recognize the mobile device 100 in the vehicle interior. The user may confine the mobile device 100 in the vehicle interior or may fail to start the engine.

In view of this, the mobile device 100 according to the present embodiment executes the following control, to prevent the vehicle-mounted communication device 10 from failing to recognize the mobile device 100 in the vehicle interior even though the mobile device 100 detecting no vibration is brought into the communication disabled state.

Figure 4:
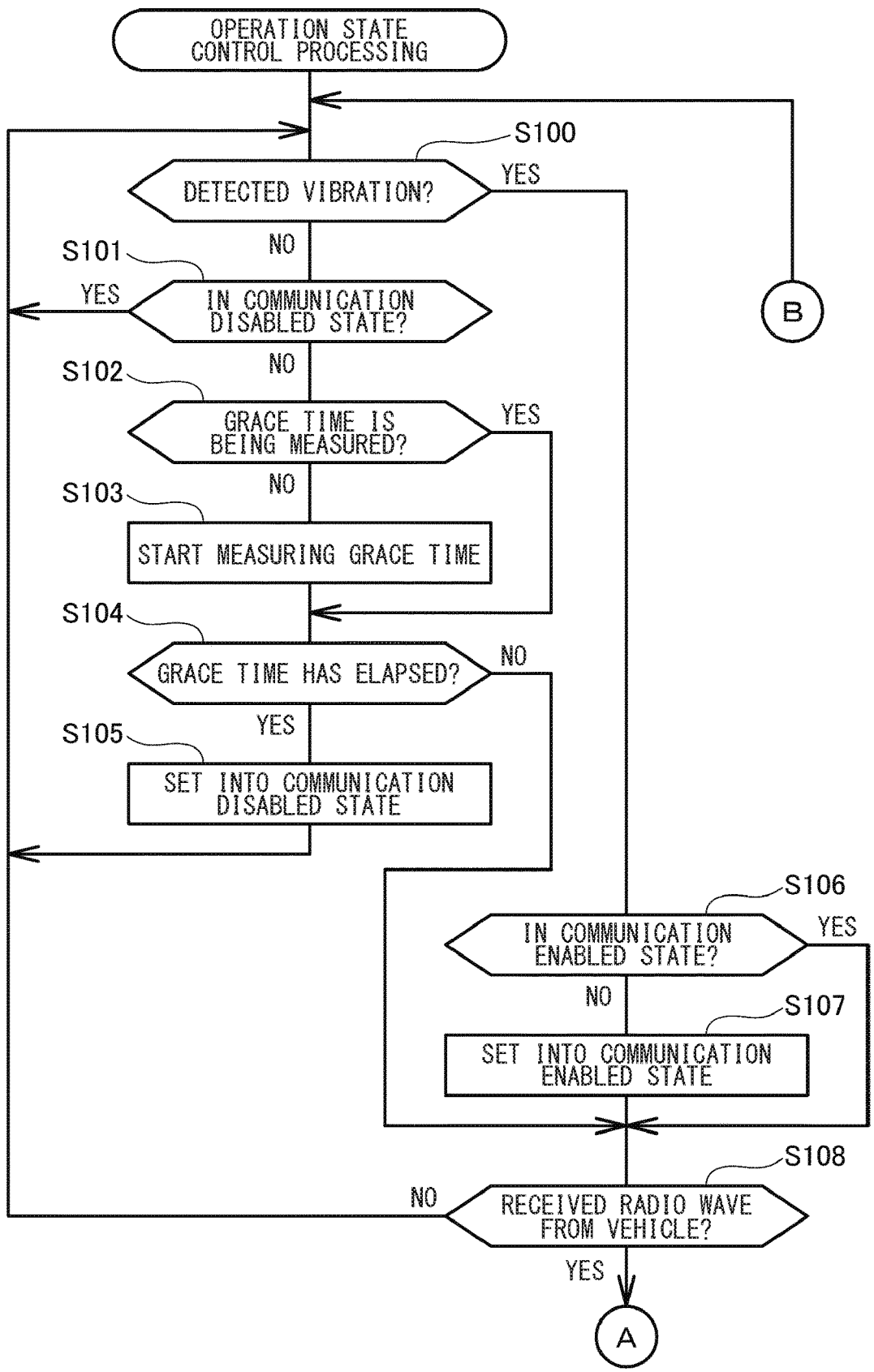
FIG. 4 is a flowchart showing a first half of an operation state control processing executed by the mobile device according to the present embodiment.
Figure 5:
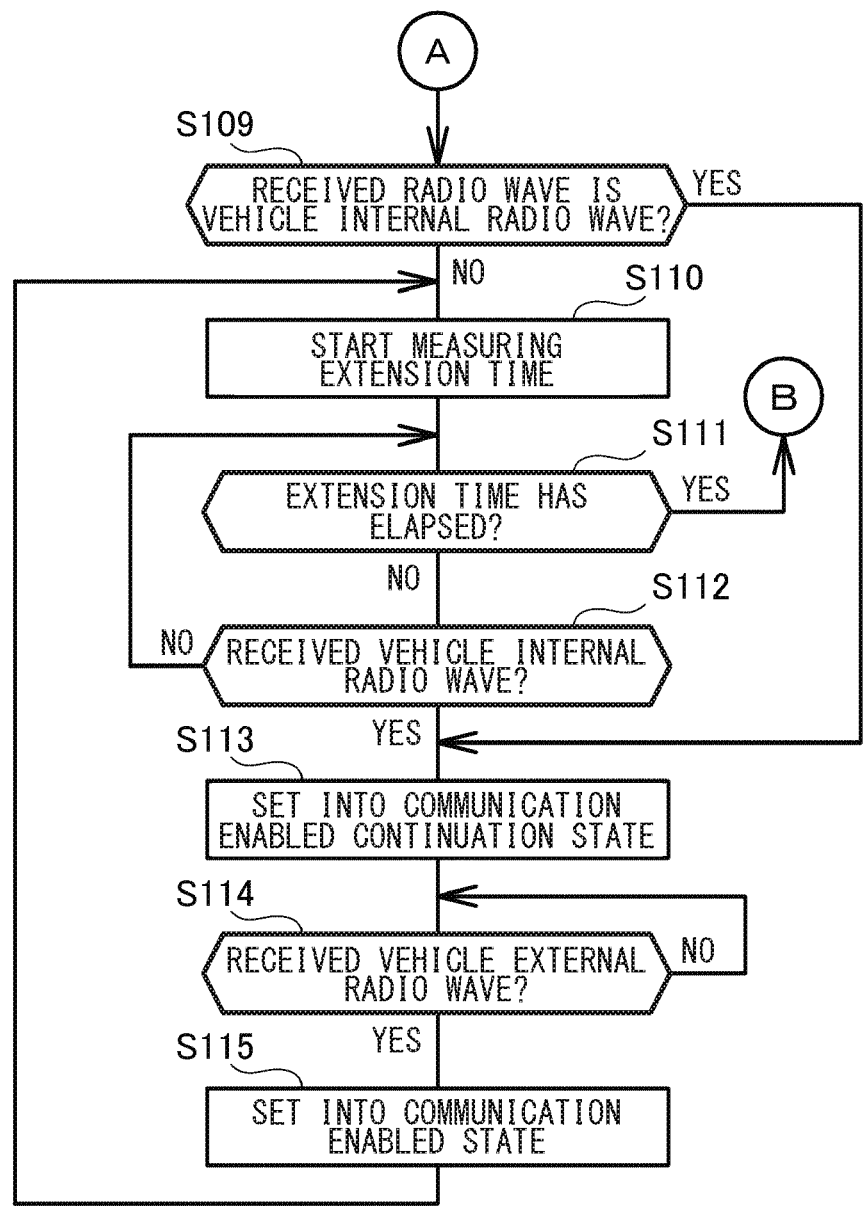
FIG. 5 is a flowchart showing a second half of the operation state control processing according to the present embodiment.

FIG. 4 and FIG. 5 are flowcharts of an operation state control processing, executed by the mobile device 100 according to the present embodiment, of being switched among a plurality of operation states including the communication enabled state and the communication disabled state. This processing is executed by the operation controller 104 in the mobile device 100.

As shown in FIG. 4, the operation controller 104 initially determines whether vibration has been detected (S100) at the start of the operation state control processing. The mobile device 100 in use is to be carried by the user, and should be vibrating while being carried by the user. To the contrary, the mobile device 100 not vibrating can be assumed as being not in use.

In view of this, if vibration has not been detected (NO in S100), the operation controller 104 determines whether the mobile device 100 is in the communication disabled state (S101). As described above, the mobile device 100 in the communication disabled state cannot wirelessly communicate with the vehicle-mounted communication device 10 due to stop of at least one of a radio wave receiving function and a radio wave transmitting function of the mobile device 100. If the mobile device 100 has been already brought into the communication disabled state (YES in S101), there is no need to bring the mobile device 100 again into the communication disabled state. The process flow thus returns to the start for determination of whether vibration has been detected (S100).

In other cases where vibration has not been detected (NO in S100) but the mobile device 100 is not yet brought into the communication disabled state (NO in S101), the operation controller 104 determines whether a grace time is being measured (S102). The grace time starts when vibration is no longer detected and ends when the mobile device 100 is switched into the communication disabled state. If vibration is detected before the grace time elapses after vibration is no longer detected, the mobile device 100 will not be switched into the communication disabled state. The grace time is set to an appropriate length (e.g., 15 seconds).

In a case where it is determined in S102 that the grace time is not being measured (NO in S102), a timer (not shown) is actuated to start measuring the grace time (S103). In another case where it is determined that the grace time is being measured (YES in S102), the operation controller 104 determines whether the grace time has elapsed without starting measurement again (S104).

In a case where the grace time has elapsed (YES in S104), the mobile device 100 is set into the communication disabled state (S105) and the process flow then returns to the start for determination of whether vibration has been detected (S100). If vibration has not been detected (NO in S100), in subsequent S101, the mobile device 100 is determined as being in the communication disabled state (YES in S101). The mobile device 100 is kept in the communication disabled state until vibration is detected (YES in S100).

In another case where the grace time has not elapsed (NO in S104), the mobile device 100 is in the state before being switched into the communication disabled state (i.e., the communication enabled state with both the radio wave receiving function and the radio wave transmitting function being active). The operation controller 104 then determines whether the mobile device 100 has received any radio wave from the vehicle 1 (S108). The mobile device 100 not existing in the radio wave coverage of the vehicle 1 will not receive any radio wave from the vehicle 1. The operation controller 104 accordingly determines that the mobile device 100 has not received any radio wave in many cases (NO in S108), and the process flow returns to the start for determination of whether vibration has been detected (S100).

In a case where no vibration has not been detected (NO in S100), the operation controller 104 determines that the mobile device 100 is not in the communication disabled state (NO in S101) but the grace time is being measured (YES in S102) and has not elapsed (NO in S104), and the mobile device 100 has not received any radio wave from the vehicle 1 (NO in S108). The process flow accordingly returns to the start again for determination of whether vibration has been detected (S100).

The grace time elapses (NO in S104) while such a process is repeated, and the mobile device 100 is set into the communication disabled state (S105). The mobile device 100 is then kept in the communication disabled state until vibration is detected (YES in S100).

If vibration has been detected (YES in S100), the operation controller 104 determines whether the mobile device 100 is in the communication enabled state (S106). In a case where the mobile device 100 is not in the communication enabled state (NO in S106), the operation controller 104 sets the mobile device 100 into the communication enabled state (S107) and then determines whether the mobile device 100 has received any radio wave from the vehicle 1 (S108). In another case where the mobile device 100 is already in the communication enabled state (YES in S106), the operation controller 104 determines whether the mobile device 100 has received any radio wave from the vehicle 1 (S108).

The mobile device 100 existing outside the radio wave coverage of the vehicle 1 is repeatedly switched between two operation states, coming into the communication enabled state upon detection of vibration and coming into the communication disabled state if vibration is no longer detected.

If the user carrying the mobile device 100 travels toward the vehicle 1, the mobile device 100 detects vibration and comes into the communication enabled state (S107). When the mobile device 100 enters the radio wave coverage of the vehicle 1, the mobile device 100 receives a radio wave from the vehicle 1 (YES in S108).

When the mobile device 100 receives the radio wave from the vehicle 1 (YES in S108), the operation controller 104 determines whether the radio wave is a vehicle internal radio wave (S109 in FIG. 5). As described above with reference to FIG. 1, the vehicle-mounted communication device 10 mounted on the vehicle 1 is configured to cause the external antenna 10*a* to transmit the radio wave at the constant cycle toward the periphery of the vehicle 1 and also cause the internal antenna 10*b* to transmit the radio wave toward the vehicle interior. The vehicle internal radio wave is the radio wave transmitted by the vehicle-mounted communication device 10 from the internal antenna 10*b* toward the vehicle interior. Such a radio wave transmitted by the vehicle-mounted communication device 10 from the internal antenna 10*b* toward the vehicle interior is called the vehicle internal radio wave, whereas a radio wave transmitted by the vehicle-mounted communication device 10 from the external antenna 10*a* toward the periphery of the vehicle 1 will be hereinafter called a vehicle external radio wave.

The user ordinarily approaches the vehicle 1 from outside the vehicle 1 and thus the mobile device 100 receives a vehicle external radio wave prior to a vehicle internal radio wave, so that "NO" is determined in S109. When "NO" is determined in S109, the operation controller 104 starts measuring extension time (S110). The extension time, which will be described in detail later, is set to be sufficiently longer (e.g., 30 minutes) than the grace time described above.

The operation controller 104 subsequently determines whether the extension time has elapsed (S111), and determines whether any vehicle internal radio wave has been received (S112) if the extension time has not elapsed (NO in S111). The mobile device 100 existing outside the vehicle 1 does not receive any vehicle internal radio wave, so that "NO" is determined in S112 and the operation controller 104 determines again whether the extension time has elapsed (S111). The mobile device 100 according to the present embodiment having received a vehicle external radio wave from the vehicle 1 is configured to be kept in the communication enabled state until the extension time has elapsed even if vibration is no longer detected. As apparent from this, during the extension time, the mobile device 100 having received a vehicle external radio wave is kept in the communication enabled state regardless of whether vibration is detected.

If the extension time has elapsed (YES in S111), the process flow returns to the start of the processing for determination of whether vibration has been detected (S100 in FIG. 4) and the subsequent series of processes described above are repeatedly executed.

In contrast, if the radio wave received from the vehicle 1 is determined as the vehicle internal radio wave (YES in S109), or if the vehicle internal radio wave is received while the extension time is being measured after reception of the vehicle external radio wave as described above (YES in S112), the mobile device 100 is then set into a communication enabled continuous state (S113). The mobile device 100 in the communication enabled continuous state, which will be described in detail later, is configured to transmit and receive the radio wave as in the communication enabled state.

Whether or not the vehicle external radio wave has been received is subsequently determined (S114). If the vehicle external radio wave has not been received (NO in S114), same determination is repeatedly executed until reception of the vehicle external radio wave.

When the vehicle external radio wave has been received (YES in S114), the mobile device 100 is set into the communication enabled state (S115). The mobile device 100 according to the present embodiment having received the vehicle internal radio wave and having come into the communication enabled continuous state is kept in the communication enabled continuous state of being able to transmit and receive the radio wave until reception of the vehicle external radio wave. The mobile device 100 in the communication enabled continuous state can continuously transmit and receive the radio wave until reception of the vehicle external radio wave.

After the vehicle external radio wave is received (YES in S114) and the mobile device 100 is set into the communication enabled state (S115), the extension time starts being measured (S110).

Figure 6:
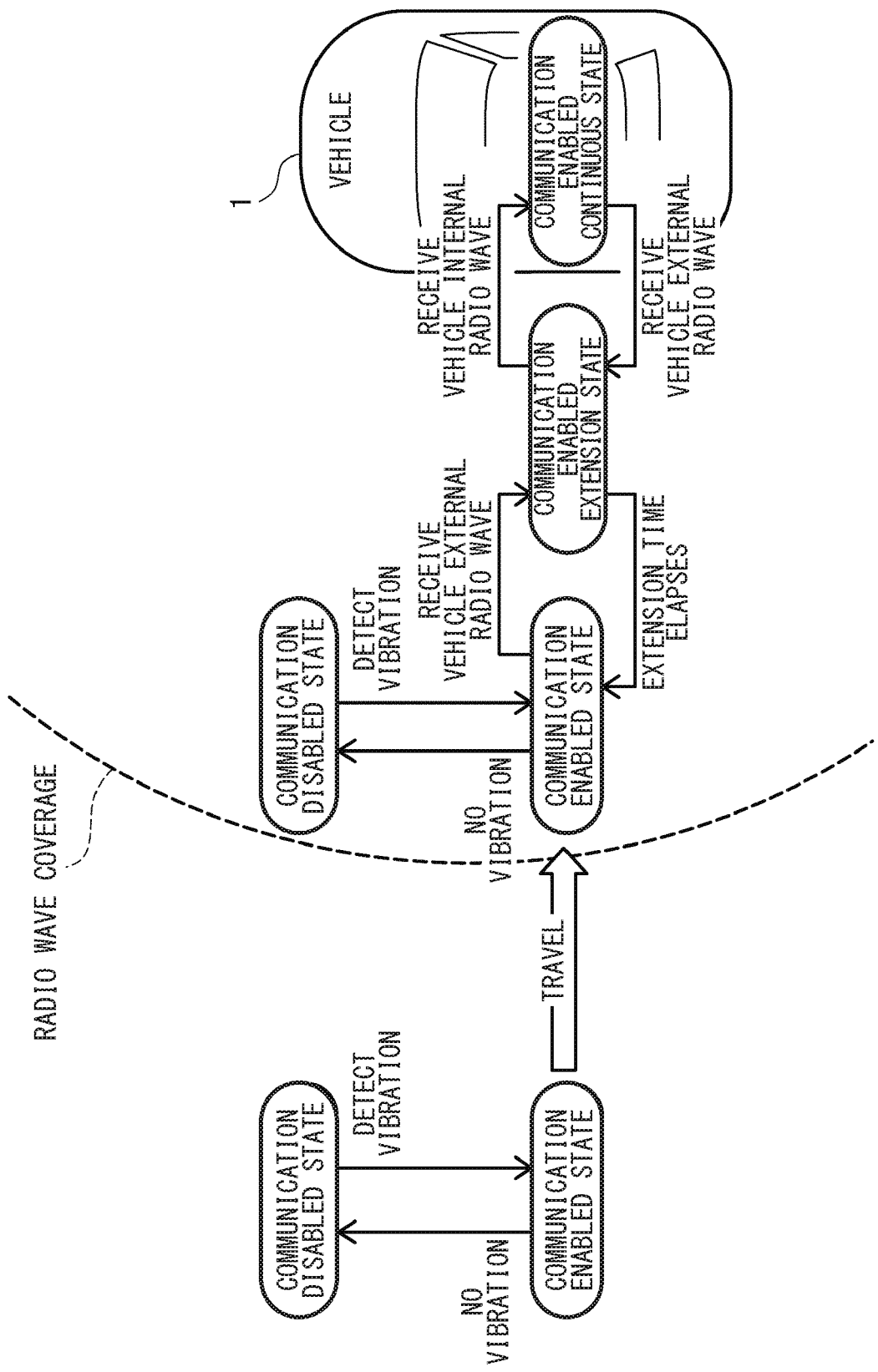
FIG. 6 is an explanatory view conceptually showing how the mobile device according to the present embodiment is switched among operation states.

FIG. 6 conceptually shows the mobile device 100 according to the present embodiment switched among the operation states through execution of the processing described above. FIG. 6 includes a broken line indicating coverage of the vehicle external radio wave transmitted from the vehicle 1, and a left side of the broken line in the figure is outside the radio wave coverage, and a right side of the broken line is within the radio wave coverage.

As shown in the figure, the mobile device 100 according to the present embodiment being outside the radio wave coverage is also (similarly to a conventional mobile device) switched, depending on whether there is vibration, between the communication enabled state of being able to transmit and receive the radio wave and the communication disabled state of being unable to execute at least one of transmission and reception of the radio wave (see S100 to S106 in FIG. 4).

Figure 7A:
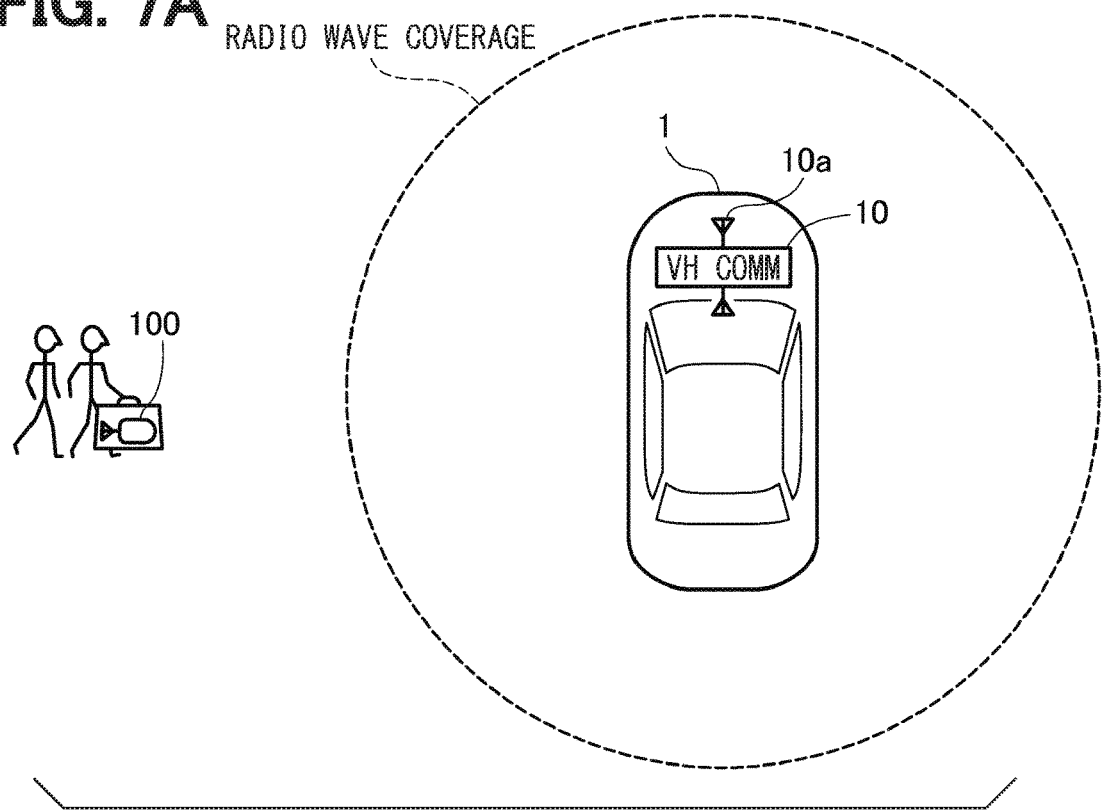
FIG. 7A is an explanatory view exemplifying a case where the user is traveling with the mobile device according to the present embodiment being outside radio wave coverage of the vehicle.
Figure 7B:
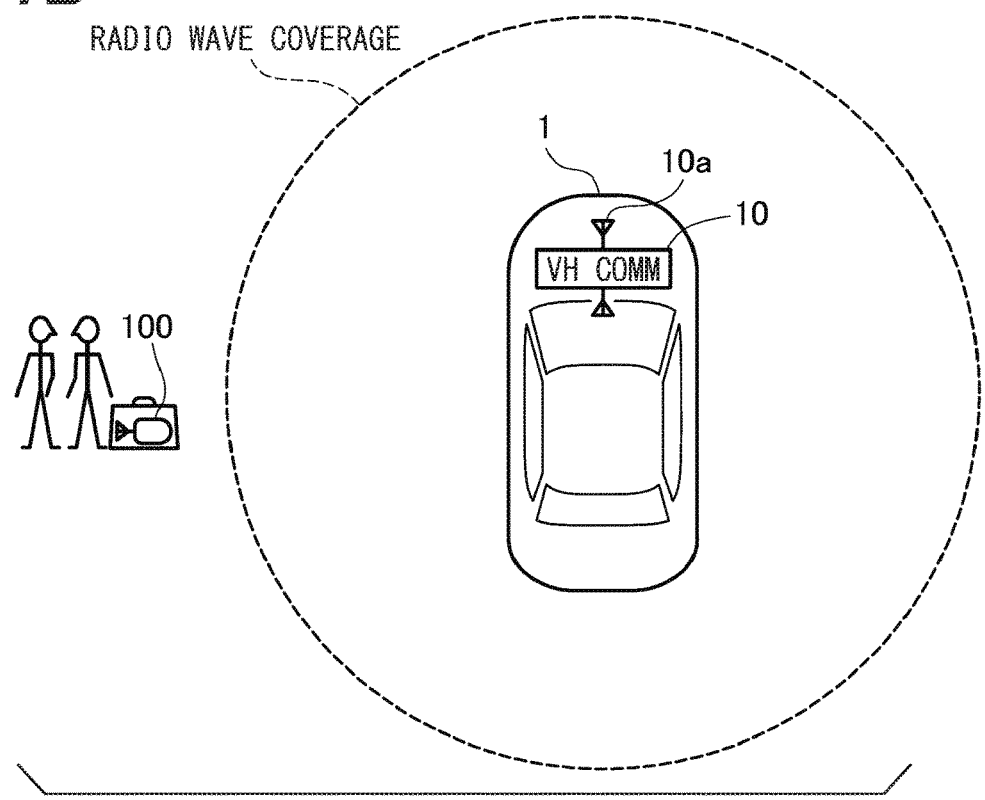
FIG. 7B is an explanatory view exemplifying a case where the user stops with the mobile device according to the present embodiment being outside the radio wave coverage of the vehicle.

The mobile device 100 is in the communication enabled state while the user carrying the mobile device 100 is traveling as exemplarily shown in FIG. 7A. The mobile device 100 is switched into the communication disabled state when the user stops and the mobile device 100 no longer detects vibration as exemplarily shown in FIG. 7B. The mobile device 100 being outside the radio wave coverage is either in the communication enabled state or in the communication disabled state.

As shown in FIG. 6, the mobile device 100 comes into the communication enabled state when the user carrying the mobile device 100 travels. When the mobile device 100 enters the radio wave coverage, the mobile device 100 receives the vehicle external radio wave from the vehicle 1 to be switched into a communication enabled extension state (see S108 in FIG. 4 to S110 in FIG. 5). The mobile device 100 in the communication enabled extension state is kept being able to transmit and receive the radio wave during the extension time regardless of whether vibration is detected. The extension time is set to be relatively long (e.g., 30 minutes).

Figure 8:
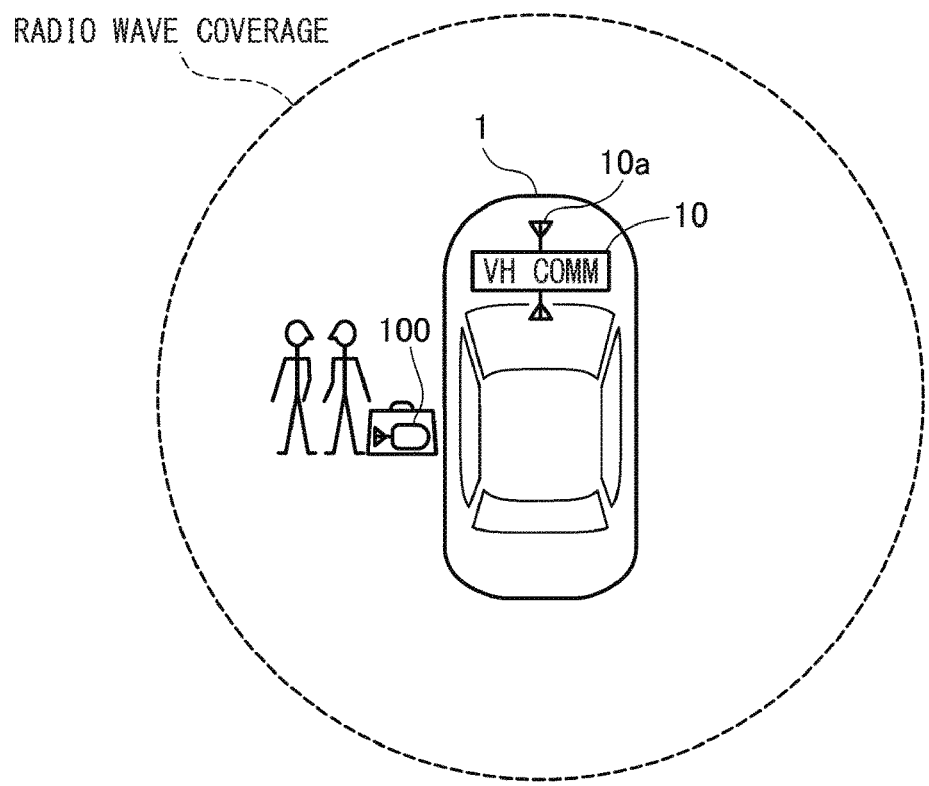
FIG. 8 is an explanatory view exemplifying a case where the mobile device according to the present embodiment is within the radio wave coverage of the vehicle.

The mobile device 100 is thus kept in the communication enabled state (at least during the extension time) even if the user of the mobile device 100 starts stand talking in front of the door of the vehicle 1 and the mobile device 100 no longer detects vibration as exemplarily shown in FIG. 8. This configuration can avoid failing to provide the user with various services, failing to promptly unlock the doors when the user having finished stand talking tries to open the doors, or consuming electric power through repeated transmission of radio waves from the vehicle 1 in order for search for the mobile device 100, because the vehicle 1 cannot detect the presence of the mobile device 100.

If the user carrying the mobile device 100 switched into the communication enabled extension state does not get on the vehicle 1 during the extension time, the mobile device 100 returns into the communication enabled state from the communication enabled extension state. The mobile device 100 comes into the communication enabled extension state again upon receipt of the vehicle external radio wave from the vehicle 1.

In contrast, if the mobile device 100 switched into the communication enabled state does not detect vibration and fails to receive the vehicle external radio wave from the vehicle 1 until the grace time elapses, the mobile device 100 comes into the communication disabled state. For example, in a case where the user finishes stand talking and travels, the mobile device 100 detects vibration and comes into the communication enabled state again. Upon receipt of the vehicle external radio wave from the vehicle 1, the mobile device 100 comes into the communication enabled extension state again.

When the user carrying the mobile device 100 thereafter gets on the vehicle 1, the mobile device 100 receives the vehicle internal radio wave and comes into the communication enabled continuous state as shown in FIG. 6. The communication enabled continuous state lasts until the user takes the mobile device 100 out of the vehicle 1 and the mobile device 100 receives the vehicle external radio wave (see S112 to S114 in FIG. 5). Even if the user carrying the mobile device 100 in the bag gets on the vehicle 1 and places the bag on the seat and the mobile device 100 keeps detecting no vibration as exemplarily shown in FIG. 9, the mobile device 100 is kept being able to transmit and receive the radio wave. When the vehicle-mounted communication device 10 on the vehicle 1 causes the internal antenna 10b to transmit the vehicle internal radio wave, the mobile device 100 returns the radio wave. While the mobile device 100 exists in the vehicle interior, the vehicle-mounted communication device 10 can thus recognize that the mobile device 100 exists in the vehicle interior.

Figure 9:
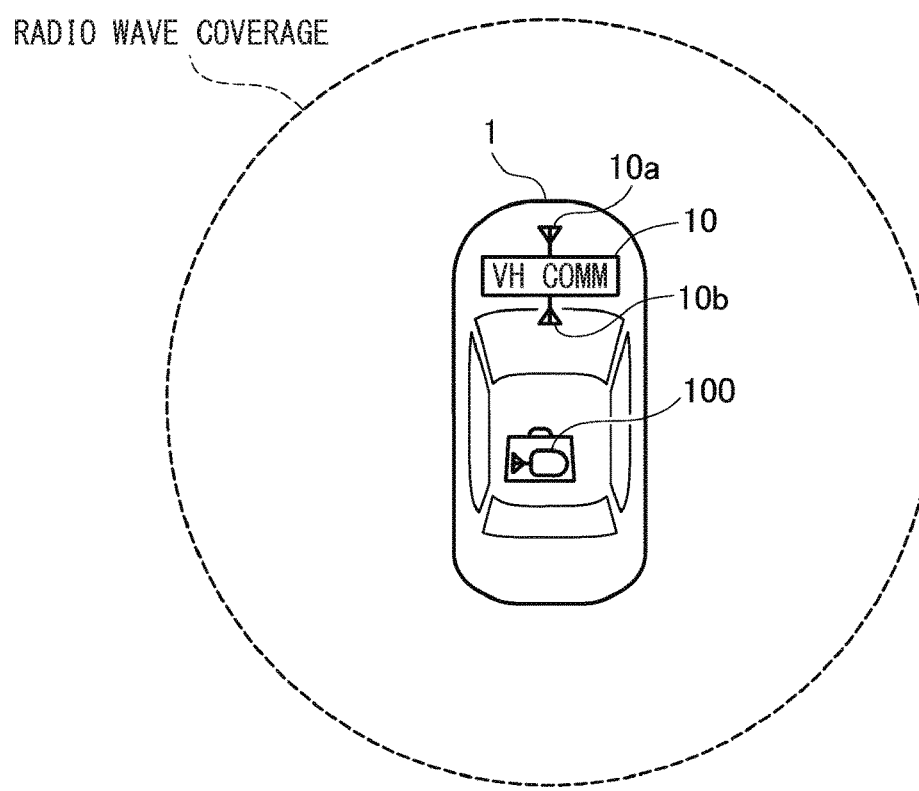
FIG. 9 is an explanatory view exemplifying a case where the mobile device according to the present embodiment exists in the vehicle interior.

Assume that the mobile device 100 is taken into the vehicle interior as shown in FIG. 9 and then comes into the communication disabled state due to detection of no vibration. For example, in a case where the user tries to start the engine, the mobile device 100 may not be recognized and the engine may not start. Otherwise, the mobile device 100 existing in the vehicle interior may not be recognized and automatic locking may be effected to confine the mobile device 100 in the vehicle interior or the doors of the vehicle 1 may be locked using another mobile device 100 with the mobile device 100 being left in the vehicle interior.

However, the mobile device 100 according to the present embodiment is in the communication enabled continuous state of being continuously able to transmit and receive the radio wave while the mobile device 100 exists in the vehicle interior, so that the vehicle-mounted communication device 10 can recognize the presence of the mobile device 100. This configuration can avoid the above situations due to the fact that the vehicle-mounted communication device 10 fails to recognize the mobile device 100 in the vehicle interior.

On the other hand, in a case where the mobile device 100 is taken out of the vehicle interior and receives the vehicle external radio wave, the mobile device 100 is switched from the communication enabled continuous state into the communication enabled state through the communication enabled extension state. The mobile device 100 in the communication enabled state is switched into the communication disabled state if vibration is no longer detected. The mobile device 100 according to the present embodiment can thus avoid exhaustion of the battery through unnecessary transmission or reception of the radio wave even though the mobile device 100 is not in use, or replying to a radio wave transmitted from the vehicle 1 located at a far place and relayed via a repeater to allow the doors of the vehicle 1 to be unlocked improperly in accordance with the radio wave.

The mobile device according to the present embodiment is in the communication disabled state with at least one of the radio wave receiving function and the radio wave transmitting function being stopped while the mobile device is not detecting vibration. Upon detection of vibration, the mobile device comes into the communication enabled state with both the radio wave receiving function and the radio wave transmitting function being active. When the mobile device in the communication enabled state receives the radio wave from the wireless communication device, the mobile device is kept in the communication enabled state even if vibration is no longer detected. The mobile device accordingly receives the radio wave from the wireless communication device before being taken into the vehicle interior to be kept in the communication enabled state. Since the mobile device is kept in the state of being able to transmit and receive the radio wave to and from the vehicle-mounted communication device even if vibration is no longer detected after the mobile device is taken into the vehicle interior, the vehicle-mounted communication device can recognize the mobile device in the vehicle interior.

According to the embodiment described above, the mobile device 100 having received the vehicle external radio wave is switched into the communication enabled extension state and is kept in the communication enabled extension state until the predetermined extension time elapses. In contrast, the mobile device 100 having received the vehicle internal radio wave is switched into the communication enabled continuous state and is kept in the communication enabled continuous state until receipt of the vehicle external radio wave (instead of elapse of time).

According to the above embodiment, switching from the communication enabled extension state is executed under a condition that the predetermined extension time elapses or the vehicle internal radio wave is received, whereas switching from the communication enabled continuous state is executed under a condition that the vehicle external radio wave is received regardless of elapse of predetermined time.

Switching from the communication enabled continuous state may alternatively be executed when a predetermined duration time elapses. Even in such a case, in most cases, switching from the communication enabled continuous state is executed in accordance with reception of the vehicle external radio wave, not in accordance with elapse of the duration time, if the duration time is set to be sufficiently long (e.g., 12 or 24 hours). Meanwhile, even in a case where the mobile device 100 is left in the vehicle interior for a long time for some reasons, exhaustion of the battery due to the mobile device 100 being kept in the continuously transmittable and receivable state can be avoided.

The flowcharts or the processing shown in the flowcharts described in the present disclosure include a plurality of sections (also referred to as steps) each of which is expressed as S100 or the like. Each of the sections can further be divided into a plurality of subsections, or a plurality of sections can be combined together to configure a single section. These sections can alternatively be referred to as circuits, devices, modules, or means.

Each of the plurality of sections or such combined sections may be embodied as (i) a software section combined with a hardware unit (e.g., a computer) or (ii) a hardware section (e.g., an integrated circuit or a wiring logic circuit), including or excluding a function of a relevant device. The hardware section may still alternatively be included in a microcomputer.

The present disclosure has been described in accordance with the embodiment, but the present disclosure should not be limited to the embodiment or the structures according to the embodiment. The present disclosure also includes various modification examples as well as modifications made within an equivalent scope. Furthermore, various combinations and modes, as well as other combinations and modes each obtained by adding only one or more elements to or removing any element from any one of the various combinations and modes will fall within the scope and the ideological scope of the present disclosure.

What is claimed is:

1. A mobile device comprising:
   a receiver configured to receive a radio wave from a wireless communication device mounted on a vehicle;
   a transmitter configured to transmit an authentication signal to the wireless communication device when the radio wave that is received by the receiver requests transmission of the authentication signal;
   a vibration detector configured to detect whether there is vibration; and
   an operation controller connected with the receiver, the transmitter, and the vibration detector, configured to bring the mobile device into a communication enabled state where the receiver and the transmitter are in operation when the vibration is detected by the vibration detector, and configured to bring the mobile device into a communication disabled state where at least one of the receiver and the transmitter is stopped when the vibration is not detected by the vibration detector, wherein
   the receiver is configured to receive the radio wave from the wireless communication device in a state where a vehicle external radio wave transmitted from the wireless communication device toward outside the vehicle and a vehicle internal radio wave transmitted from the wireless communication device toward inside a vehicle interior are distinguishable,
   when the vibration is not detected for a predetermined grace time in the communication enabled state, the operation controller switches the mobile device from the communication enabled state into the communication disabled state,
   when the receiver receives the vehicle external radio wave in the communication enabled state, the operation controller keeps the mobile device in the communication enabled state for a predetermined extension time longer than the predetermined grace time even if the vibration is not detected, and
   when the receiver receives the vehicle internal radio wave in the communication enabled state, the operation controller brings the mobile device into a communication enabled continuous state where the receiver and the transmitter are in operation even if the vibration is no longer detected.

2. The mobile device according to claim 1, wherein
   when the vibration is not detected for a predetermined duration time longer than the predetermined extension time in the communication enabled continuous state, the operation controller switches the mobile device from the communication enabled continuous state into the communication enabled state.

3. The mobile device according to claim 1, wherein
   when the receiver receives the vehicle external radio wave in the communication enabled continuous state, the operation controller switches the mobile device from the communication enabled continuous state into the communication enabled state.

4. A method of controlling a mobile device configured to transmit an authentication signal to a wireless communication device mounted on a vehicle by communication with the wireless communication device, the wireless communication device configured to transmit a vehicle external radio wave toward outside the vehicle and configured to transmit a vehicle internal radio wave toward inside the vehicle, the method comprising:
   detecting whether there is vibration of the mobile device;
   when the vibration is not detected, bringing the mobile device into a communication disabled state where at least one of a function of receiving a radio wave from the wireless communication device in a state where the vehicle external radio wave and the vehicle internal radio wave are distinguishable and a function of transmitting the authentication signal to the wireless communication device is stopped;
   when the vibration is detected, bringing the mobile device into a communication enabled state where the function of receiving the radio wave from the wireless communication device in the state where the vehicle external radio wave and the vehicle internal radio wave are distinguishable and the function of transmitting the authentication signal to the wireless communication device are active;
   when the vibration is not detected for a predetermined grace time in the communication enabled state, switching the mobile device from the communication enabled state into the communication disabled state;

when the vehicle external radio wave is received in the communication enabled state, keeping the mobile device in the communication enabled state for a predetermined extension time longer than the predetermined grace time even if the vibration is not detected; and when the vehicle internal radio wave is received in the communication enabled state, keeping the mobile device in the communication enabled state even if the vibration is no longer detected.

* * * * *